United States Patent [19]

Landry et al.

[11] Patent Number: 4,512,142
[45] Date of Patent: Apr. 23, 1985

[54] SCROLL-TYPE GATHERER AND TOP SHREDDER WITH LONGITUDINAL BLADES FOR SUGAR CANE HARVESTER

[76] Inventors: Walter J. Landry, P.O. Box 788, Jeanerette, La. 70544; Robert T. André, P.O. Box 313, New Iberia, La. 70560

[21] Appl. No.: 552,472

[22] Filed: Nov. 16, 1983

Related U.S. Application Data

[63] Continuation-in-part of Ser. No. 542,700, Oct. 17, 1983, abandoned.

[51] Int. Cl.$^3$ ............................................. A01D 45/10
[52] U.S. Cl. .................................... 56/13.9; 56/14.3; 56/63
[58] Field of Search ..................... 56/13.9, 14.3, 14.5, 56/63, 59, 13.7, 503, 500, 56, 53

[56] References Cited

U.S. PATENT DOCUMENTS 3,772,864  11/1973  Rodrigue ............................... 56/63
3,791,114  2/1974  Fowler .................................. 56/13.9
4,408,441  10/1983  Willett .................................... 56/63

Primary Examiner—Jay N. Eskovitz
Attorney, Agent, or Firm—Clarence A. O'Brien; Harvey B. Jacobson

[57] ABSTRACT

An attachment for a sugar cane harvester for gathering, severing and chopping or shredding the non-millable, immature top portions of a sugar cane stalk so that the remaining millable portion of the sugar cane stalk can be harvested by the sugar cane harvester in a conventional manner. The attachment includes a scroll-type gathering system interconnected with a rotary knife assembly to form one integral unit with the knife assembly which includes a unique arrangement of radial and longitudinal blades mounted on a drum or cylinder which rotates about an axis which is inclined upwardly and forwardly at a fixed angle to vertical to provide more effective shredding of the non-millable cane top with the gathering system enabling the sugar cane harvester to more efficiently handle brittle sugar cane varieties with reduced breakage of the brittle stalk, thereby enabling sugar cane growers to utilize more brittle sugar cane species which are resistant to smut and other diseases and insects with the efficient shredding of the cane top permitting increased sugar cane borer control by eliminating a significant portion of the winter habitat of the sugar cane borer.

16 Claims, 4 Drawing Figures 4,512,142

SCROLL-TYPE GATHERER AND TOP SHREDDER WITH LONGITUDINAL BLADES FOR SUGAR CANE HARVESTER

CROSS-REFERENCE TO RELATED APPLICATION

This application is a continuation-in-part of copending application Ser. No. 542,700, filed Oct. 17, 1983, for SCROLL-TYPE GATHERER AND TOP SHREDDER FOR SUGAR CANE HARVESTER now abandoned.

BACKGROUND OF THE INVENTION

1. Field of the Invention

The present invention generally relates to an attachment for a sugar cane harvester which gathers, removes and shreds the immature, non-millable top portions of sugar cane stalks thereby providing a more efficient harvesting operation with the attachment including scroll-type gatherers which will more effectively gather and lift the upper end portions of the sugar cane stalks and the associated leaves so that the sugar cane harvester can handle sugar cane varieties which are more brittle with less breakage of brittle stalks and the cutting and shredding is effectively accomplished by a rotating knife assembly having a plurality of radially projecting knives and a plurality of longitudinal tangential knives oriented on a generally circular bottom plate and cruciform top member rotating about an axis inclined forwardly and upwardly to more effectively cut and shred the non-millable top portions of the sugar cane stalks with the shredded portions being discharged back onto the ground surface or collected if desired.

2. Description of the Prior Art

Sugar cane harvesters have been in use for many years and basically include a device for gathering the sugar cane stalks and severing the stalks adjacent to ground level with the cut stalks dropped onto the ground for loading onto a vehicle for transport to a sugar cane mill. The sugar cane stalk includes a mature millable portion constituting the major portion of its length with the sugar cane also including an immature upper portion which is not millable and is normally discarded and normally severed from the lower portion of the sugar cane stalk and deposited in the field. Sugar cane harvesters have been provided with topping devices which usually include a frame with gathering chains having fingers projecting therefrom and a rotating knife or blade assembly rotatable about a vertical axis which severs the immature non-millable top portion from the remainder of the sugar cane stalk with the severed top being dropped onto the ground. The severed sugar cane tops ultimately decompose but provide a winter habitat for sugar cane borers and other harmful insects, diseases and the like.

The following U.S. patents are exemplary of the prior art in this field of endeavor:

U.S. Pat. Nos. 3,462,927, Aug. 26, 1969; 3,561,197, Feb. 9, 1971; 3,705,481, Dec. 12, 1972; 3,772,864, Nov. 20, 1973; 3,791,114, Feb. 12, 1974; 3,925,696, Dec. 16, 1975; 3,934,391, Jan. 27, 1976; 3,942,307, Mar. 9, 1976.

SUMMARY OF THE INVENTION

An object of the present invention is to provide an attachment for a sugar cane harvester for gathering and severing of sugar cane tops from millable stalks of sugar cane with the gathering device including a scroll-type gathering system associated with a rotary knife assembly including radial and longitudinal knives or blades rotatable about an inclined axis for separating the non-millable top from the millable stalk of the sugar cane and shredding or chopping the separated non-millable top into smaller segments or components.

Another object of the invention is to provide an attachment for or a component of a sugar cane harvester including a scroll-type gathering system for engaging and lifting the leaves and stalk component of sugar cane in order to orient the sugar cane tops in position for cutting and shredding by a rotary knife assembly with the scroll-type gathering system enabling varieties of sugar cane to be grown which are more brittle and more resistant to smut, various diseases and insects with the cutting and shredding of removed tops eliminating or substantially reducing the winter habitat of harmful insects such as sugar cane borers.

A further object of the invention is to provide a top shredder for a sugar cane harvester for cutting and shredding the top portions of sugar cane stalks by a rotary knife assembly including a carrier having radial and longitudinal knives or blades which rotates about a forwardly and upwardly inclined rotational axis for more efficiently cutting the sugar cane tops into smaller segments.

Still another object of the invention is to provide the combination of a scroll gathering system and an inclined rotary knife assembly for topping sugar cane which reduces maintenance costs, provides more gentle handling of the sugar cane stalks and better shredding of the non-millable cane top.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
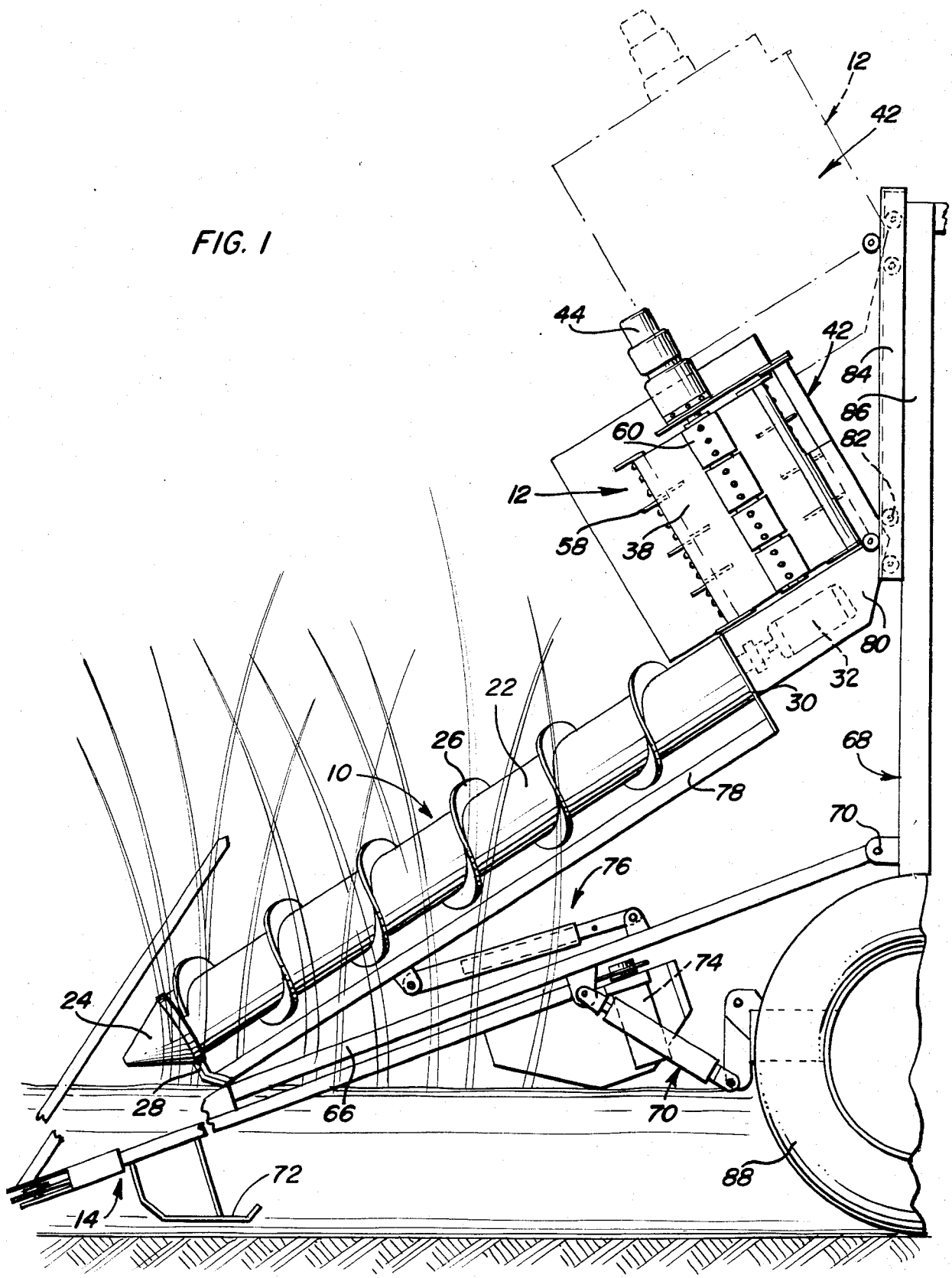
FIG. 1 is a side elevational view of the scroll-type gatherer and sugar cane top shredder of the present invention.

Referring now specifically to the drawings, the scroll-type gathering system is generally designated by reference numeral 10 and the rotary knife assembly at the rearward end thereof is generally designated by reference numeral 12. These components are associated with each other and associated with a conventional existing sugar cane harvester including the usual harvester components generally designated by numeral 14 in FIG. 1 which includes gathering chains and cutter arrangements located adjacent the lower end of sugar cane stalks 16 for severing the sugar cane stalks for transport to the mill. The gathering system and the knife assembly of the present invention gather and lift the top portions 18 of the sugar cane stalks 16 and cut and chop the sugar cane tops into smaller segments.

Figure 2:
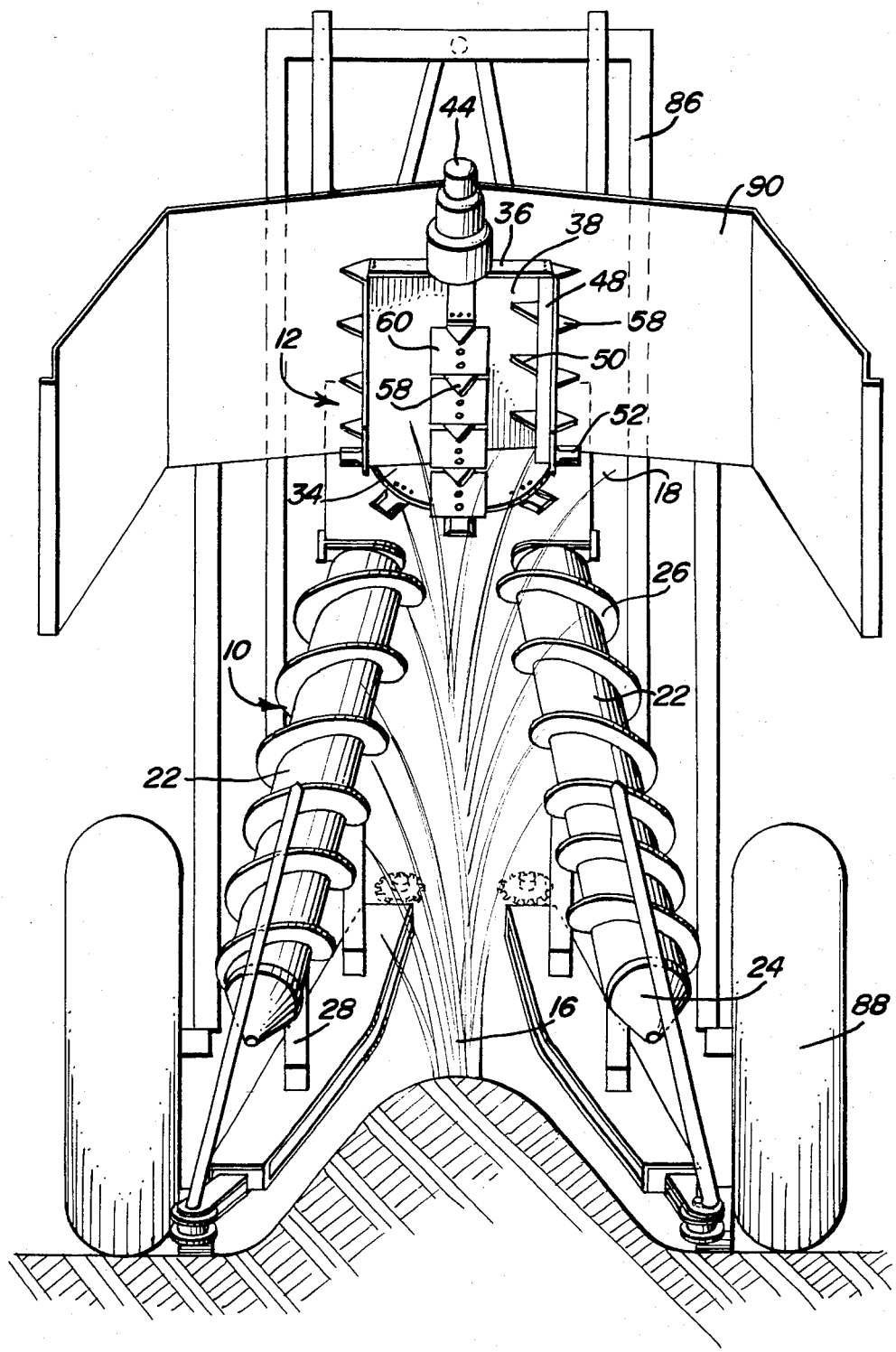
FIG. 2 is a front elevational view of the present invention illustrating the device associated with other components of a sugar cane harvester.
Figure 4:
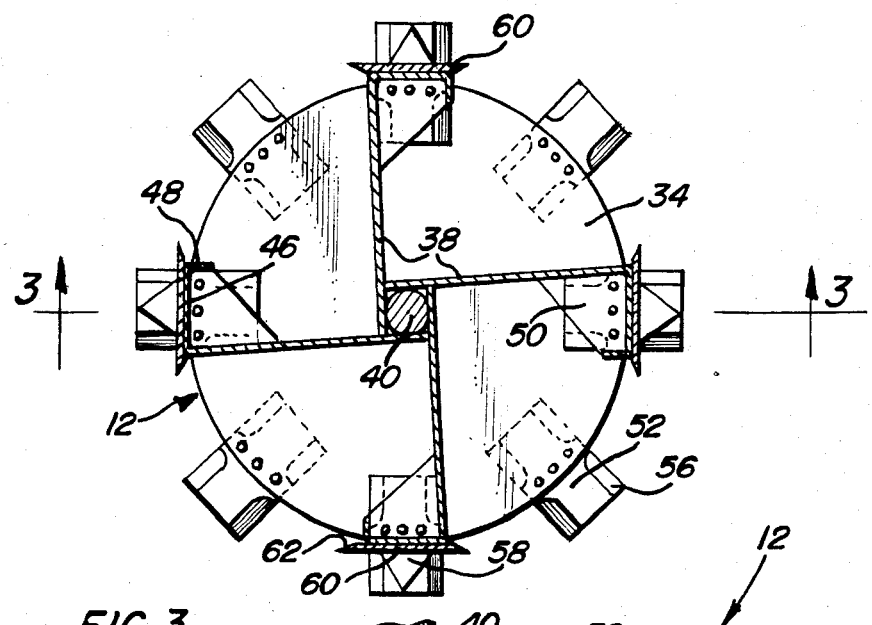
FIG. 4 is a longitudinal sectional view of the top shredder assembly taken along section line 4—4 on FIG. 3.

The gathering system or mechanism 10 includes a pair of tubular members 22 having a forward tapering end 24 and a spiral flange 26 extending from the tapered forward end throughout the length of the member 22. As illustrated in FIGS. 1 and 2, the members 22 are oriented in upwardly inclined and rearwardly converging relation and the spiral flanges 26 engage the cane stalk on opposite sides thereof and lift the cane stalk and leaves upwardly as the sugar cane harvester moves fowardly. The spiral flange or rib 26 on one member 22 is oppositely spiraled in relation to the other so that as the members 22 rotate, the sugar cane stalk and leaves thereon will be engaged and lifted with the top of the sugar cane stalk being positioned above the members 22. The members 22 are rotatably supported at the forward end as at 28 and at the rearward end as at 30 and are rotatably driven in any suitable manner at the rearward end by a suitable power device such as a hydraulic motor 32 or the like connected to an end shaft on the member 22. The specific details of the manner in which the scroll-type gathering system is rotated may be varied and may be conventional in and of itself.

The knife assembly 12 includes a generally circular bottom plate 34 and cruciform top member 36 interconnected by a plurality of radially extending members 38 tangentially engaging and anchored to a central shaft 40 that is rotatably supported by suitable bearings from frame structure 42 and driven by a reversible hydraulic motor 44 drivingly connected to the upper end of the shaft 40 and supported from the frame structure 42 which is rigid with the supporting structure for the members 22 and motor 32 to maintain a fixed angular relationship between the rotational axis of the knife assembly 12 and the members 22. The outer edge of each radial member 38 includes a laterally extending member 46 terminating in an inturned flange 48 reinforced by a plurality of vertically spaced gussets 50. Attached to the bottom plate 34 is eight substantially rectangular, flat blades 52 secured to the plate 34 by fastening rivets, bolts or other fasteners 54 along the center of the blades 52 so that the blades can be reversed after the portion thereof which extends radially beyond the bottom plate 34 has become worn or dull. The longitudinal edges of the blade which extend radially from the plate 34 are tapered or sharpened as at 56 so that the knife assembly 12 can be driven in either direction. Thus, as the blades 52 become worn, they can be removed and reversed in order to enable longer use of the device prior to sharpening the blades.

Figure 3:
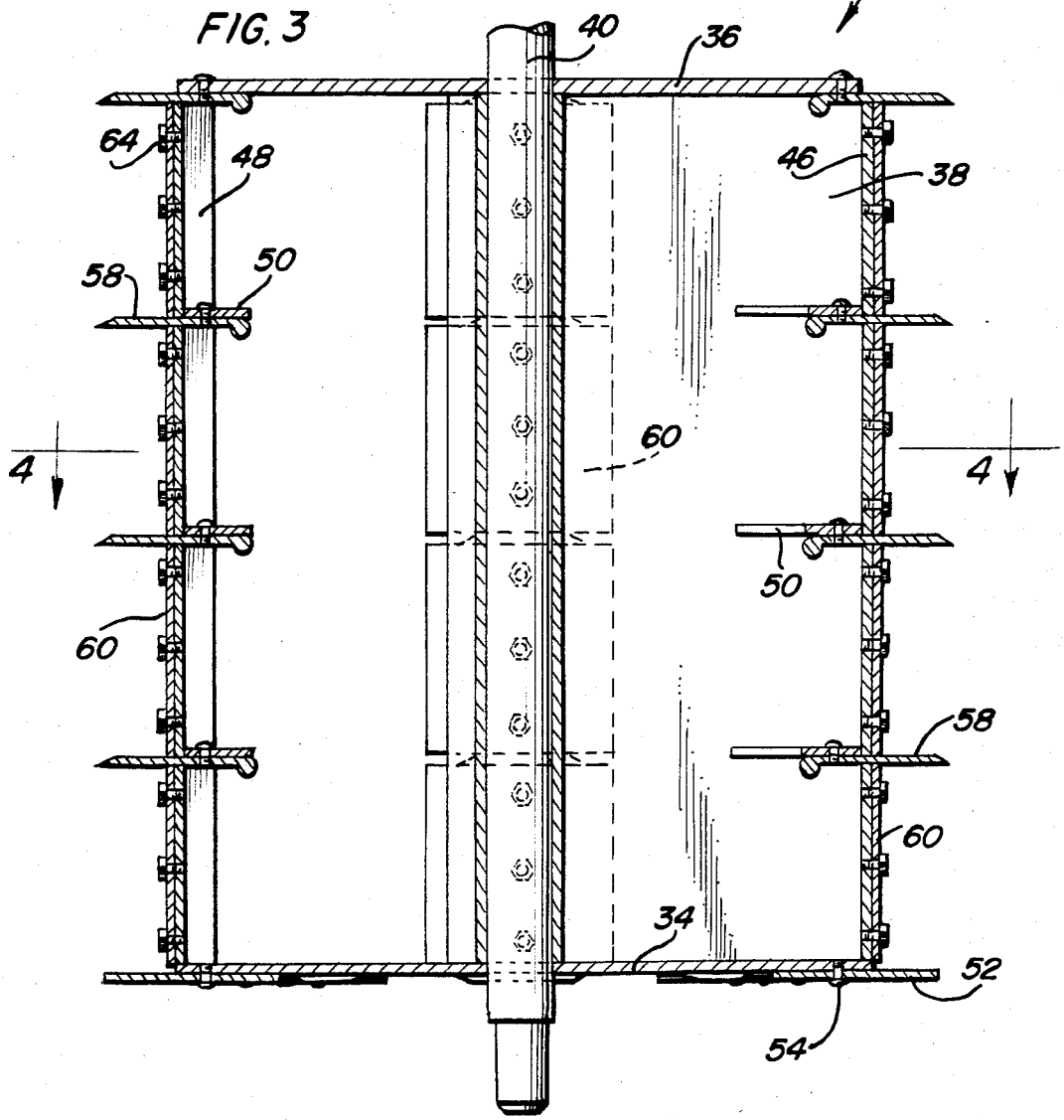
FIG. 3 is a transverse sectional view of the top shredder assembly along section line 3—3 on FIG. 4.

Attached to each of the gussets 50 is a plurality of vertically spaced, generally triangular blades 58 with the blades 58 being arranged in four rows and extending outwardly through the lateral member 46 and being secured to the gussets 50 in any suitable manner to enable replacement and removal thereof. Attached to the outer face of each lateral member 46 is a plurality of longitudinally extending blades 60 which are of rectangular configuration and cooperate with each other to form a substantially continuous longitudinal blade or knife having tapered and sharpened side edges 62 and secured to the lateral member 46 by fasteners 64 to enable replacement when desired. The blades 60 are generally tangentially arranged with respect to the periphery of the circular bottom plate 34 and tangentially with respect to the circular path of movement of the members 46. Also, the segmental blades 60 are preferably constructed with continuous sharpened cutting edges 62 for more effective cutting action. Thus, the knife assembly 12 includes eight horizontal blades 52 equally spaced about the periphery of the bottom plate 34 and projecting radially therefrom, four rows of tangential vertical blades 60 mounted on the lateral members 46 at the outer edge of the radial members 38 with four rows of triangular horizontal blades 58 extending through slot-like structures in the members 46 and the tangential blades 60 with the triangular blades 58 being of less width than the blades 60 is illustrated in FIG. 3 and having a radial length generally equal to the radial length of the blades 52 as illustrated in FIGS. 2 and 3. The vertical cutting blade in conjunction with the horizontal blades produces more effective shredding, cutting, disintegrating and chopping of the tops 18 of the sugar cane stalks 16. The rigid and fixed relationship of the knife assembly 12 and the gathering assembly 10 provides a simplified structure and maintains a constant relationship of the blades to the sugar cane tops being lifted and gathered by the gathering assembly with it being pointed out that the knife assembly may be rotated in either direction and the combination of the vertical and horizontal knives produces a much more effective chopping and cutting of the sugar cane tops for discharge of the chopped segments in either direction.

The sugar cane harvester includes a frame structure 66 pivotally supported at its rear to a harvester vehicle 68 at pivot point 70. A hydraulically operated power mechanism may be used to elevate the forward end of the harvester 14 in a known manner with the forward end of the harvester 14 including a skid 72 and chains with fingers or projections thereon which are supported in a conventional manner and converge inwardly in a conventional manner with the chains being driven by a hydraulic motor 74. Alternatively, the sugar can harvester may use a pair of scrolls similar to those used in gathering system 10 in lieu of the conventionally used chains and fingers for more effectively harvesting sugar cane. A link 76 pivotally interconnects the frame structure 66 and a frame 78 which extends longitudinally of the gathering system 10 which is rigid with frame structure 80 which supports the hydraulic motor 32 and other drive structure which drivingly connects the members 22 and the frame structure 42 which supports the knife assembly 12 and motor 44. The frame structures 42 and 80 are rigid with each other and are supported by carriage rollers 82 supported in trackways 84 carried by an upright supporting structures 86 forming part of the vehicle 68 which generally extend above the supporting wheels 88 on the vehicle 68 with the elevated position of the gatherer and knife assembly being illustrated in broken line in FIG. 1. A suitable mechanism such as a hydraulic ram may be used to move the gatherer 10 and knife assembly 12 from the lowermost position as illustrated in FIG. 1 to the elevated position illustrated in broken line in FIG. 1 so that the elevated position of the gathering system 10 and knife assembly may be varied in a well known manner. The specific mechanism for vertically adjustably supporting the gathering and cutting mechanism may be varied depending upon the structural requirements with various supporting bearings, lubricating features and drive connections being provided for the components by which the two members 22 may be rotated in opposite directions for moving the top of the sugar cane stalks upwardly and rearwardly and the blade assembly 12 rotated in a manner so that the sugar cane tops will be cut off and cut into small components and discharged laterally in either direction onto a conventional shield structure 90 for discharge in front of the harvester wheels 88. Guide bars or deflectors are provided at the forward ends of the sugar cane harvester and at the forward ends of the gathering system 10 for guiding sugar cane stalks therebetween. Vertical adjustment of the gathering system and rotary knife assembly enables the height at which the sugar cane tops are severed to be adjusted depending upon the height of the crop being harvested.

The present invention involves the use of the scroll-type gathering system including the two members 22 with the spiral flanges 26 thereon which will engage and lift the leaves and sugar cane stalks and orient the top of the sugar cane stalk and the upper leaves in a position for cutting and chopping into smaller segments by the knife assembly 12 which is oriented above the gathering assembly at the rear thereof with the lowermost knive blades being closely adjacent the upper surface of the scroll gathering system. This enables the normally discarded unmillable tops to be cut into small segments and discharged onto the ground surface in a windrow or scattered in any desired direction or conveyed to another disposal site if desired. The gathering and cutting mechanism may be elevated between maximum and minimum cutting heights depending upon the height of the sugar cane crop being harvested and enables sugar cane of more brittle varieties to be effectively grown by sugar cane growers. The scroll-type gathering systen will handle cane more gently and thereby avoid or reduce breaking of brittle varieties of sugar cane. The inclination of the topping knife assembly increases the shredding ability and produces an integrated arrangement with less components including less chains, sprockets, bearings and the like thereby providing a more dependable durable, and long lasting device that requires less maintenance. The rear of the gathering system and the cutter may be guided by a vertical guide frame or channels on the harvester. The more effective shredding of the cane tops reduces or substantially eliminates a winter habitat for insects and pests such as sugar cane borers and the like and also facilitates decomposition of the sugar cane tops when deposited on the ground surface.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A sugar cane gathering and topping attachment for a sugar cane harvester comprising a pair of laterally spaced, upwardly and rearwardly inclined gathering means for engaging and lifting the leaves on the upper portion of the sugar cane stalks and guide the same rearwardly in relation to the sugar cane harvester, and a cutter means located at the rear end of said gathering means for cutting the non-millable upper end portion of the sugar cane stalk from the millable lower portion thereof and chopping the non-millable portion into small segments, said cutter means comprising a driven rotatable knife carrier, a plurality of vertically spaced horizontal knives mounted on said carrier for movement in spaced circular paths having a center coinciding with the rotational axis of the carrier and a plurality of longitudinal knives mounted on said carrier for cutting and chopping the upper end portion of sugar cane stalks and discharging the cut and chopped stalks laterally of the carrier.

2. The topping attachment as defined in claim 1 wherein the horizontal knives are circumferentially spaced about the periphery of the carrier in vertically and circumferentially spaced relation and the longitudinal knives are circumferentially spaced around the periphery of the carrier and disposed in tangential relation thereto with the longitudinal knives having two oppositely facing continuous cutting edges.

3. The topping attachment as defined in claim 1 wherein the axis of rotation of the carrier is inclined forwardly from vertical for progressively cutting the upper end of the sugar cane stalk from the top down.

4. The topping attachment as defined in claim 1 wherein each of the gathering and lifting means includes an elongated hollow member having a continuous peripheral surface, and a spiral projecting rib means on said hollow member to form a scroll-type gathering and lifting means.

5. The topping attachment as defined in claim 4 wherein said hollow member includes a smoothly tapering forward end with the hollow member being circular in cross-sectional configuration.

6. The topping attachment as defined in claim 5 wherein said ribs mean includes a flange having substantially flat radial surfaces and a thin outer edge to gather, lift and convey rearwardly the upper end of sugar cane stalks.

7. The topping attachment of claim 2 wherein said carrier includes a bottom member and top member interconnected by a plurality of radially extending members with each radially extending member terminating in a longitudinal member, said longitudinal knives being mounted on said longitudinal member substantially perpendicular relation to the radially extending member with both longitudinal edges of the knives being sharp for rotation in either direction.

8. The topping attachment of claim 7 wherein the bottom member is a circular plate with a plurality of said horizontal knives being mounted on said plate and being of rectangular configuration with the parallel side edges extending beyond the periphery of the circular plate for cutting the tops of sugar cone stalks when rotated in either direction.

9. The topping attachment of claim 8 wherein the top member is cruciform in configuration with the longitudinal knives and the vertically spaced horizontal knives being mounted in alignment with the four arms of the cruciform top member.

10. The topping attachment as defined in claim 9 wherein each of the gathering and lifting means includes an elongated hollow member having a continuous peripheral surface, and a spiral projecting rib means on said hollow member to form a scroll-type gathering and lifting means.

11. The topping attachment as defined in claim 10 wherein said hollow member includes a smoothly tapering forward end with the hollow member being circular in cross-section configuration, wherein said ribs means includes a flange having substantially flat radial surfaces and a thin outer edge to gather, lift and convey rearwardly the upper end of sugar cane stalks.

12. In a sugar cane harvester, a cutter and chopping device for cutting the non-millable upper portion of the sugar cane stalk from the millable lower portion and chopping the upper portion into small segments, said device comprising a driven, rotatably supported knife carrier, a plurality of radially extending knives and a plurality of longitudinal knives mounted on said carrier with the longitudinal knives being tangentially oriented in relation to the circular path movement of the radially extending knives, said longitudinal knives being circumferentially spaced around the periphery of the carrier, said radial knives being vertically spaced and arranged in alignment with and projecting perpendicularly from said longitudinal knives.

13. The structure as defined in claim 12 wherein said carrier includes a circular bottom plate, certain of said radial knives projecting from the periphery of said bottom plate and having generally parallel cutting edges for cutting and chopping when rotated in either direction, said radial knives projecting from the longitudinal knives being V-shaped for cutting and chopping when rotated in either direction, said longitudinal blades having both vertical side edges sharpened for cutting and chopping when rotated in either direction.

14. A sugar cane harvester comprising a sugar cane gathering and lifting means to engage and lift the leaves on sugar cane stalks oriented in a row during forward movement of the harvester, and a rotatable cutting and chopping assembly located at the rear of and above the gathering and lifting means for cutting and chopping the top portions of the sugar cane stalks being guided and lifted by the gathering and lifting means, said guiding and lifting means including a pair of upwardly and rearwardly inclined generally cylindrical rotatable members with spiral rib means thereon, means driving the cylindrical members, said cylindrical members receiving a row of sugar cane stalks therebetween with the rib means moving in a path to lift the leaves and adjacent portions of the stalks to position the top portions thereof for cutting and chopping as they move into position for engagement by the cutting and chopping assembly, said cutting and chopping assembly including a plurality of blades movable in circular paths oriented at different elevations above the cylindrical members to cut and shred the top portions of the stalks throughout the length thereof.

15. The structure as defined in claim 14 wherein said cutting and chopping assembly blades includes a plurality of vertically spaced radial blades and a plurality of circumferentially spaced longitudinal blades.

16. The structure as defined in claim 15 wherein said harvester includes means below the cylindrical members to engage and move the lower portions of sugar cane stalks into a cutter mechanism, said cutting and chopping assembly being rotatably driven about a forwardly and upwardly inclined axis generally aligned with the sugar cane stalks passing rearwardly between the cylindrical members.

* * * * *